Patented Mar. 7, 1944

2,343,635

UNITED STATES PATENT OFFICE 2,343,635

PROCESS FOR CONCENTRATING WEAK NITRIC ACID

Herman A. Beekhuis, Jr., Petersburg, Va., assignor to The Solvay Process Company, New York, N. Y., a corporation of New York No Drawing. Application October 19, 1940, Serial No. 361,895

2 Claims. (Cl. 23—160)

This invention relates to a process for concentrating weak nitric acid.

Nitric acid is commercially produced by absorbing nitrogen oxides in water. From the absorption of the nitrogen oxides a dilute acid of 20% to 40% and somewhat higher may be readily produced but for most purposes a stronger acid is required. Acid of strengths above 50% up to substantially 68% may be obtained by distilling the weak acid and if an even more concentrated acid is desired, this may be obtained by distilling the acid from admixture with sulfuric acid. In producing the higher strengths acid, it is advantageous to preliminarily distill the weak acid to a strength above 60% before mixing it with the sulfuric acid and distilling out the desired high strength acid.

In distilling the weak nitric acid, nitric acid is lost even under the best of the conditions heretofore used for carrying out the distillation. There has also been corrosion of the pipe lines leading the water vapor from the distillation apparatus and of the equipment used to condense the water vapor and, when the distillation is under a vacuum, to maintain the desired low pressure in the distillation apparatus. Furthermore, in distilling the acid under vacuum substantial quantities of non-condensable gases are mixed with the steam boiled out of the weak acid. This has decreased the efficiency of the vacuum distillation apparatus or has required the use of particular evacuating means designed to remove from the apparatus the non-condensable gas after the steam has been condensed by passage in contact with surface condensers.

It is an object of this invention to provide a process whereby weak nitric acid may be distilled with minimum losses of nitric acid and maximum efficiency of apparatus used for its vacuum distillation. It is a further object of the invention to provide a process whereby weak nitric acid may be distilled under a vacuum and the desired vacuum maintained in a particularly effective, economic manner.

I have discovered the above-described difficulties heretofore encountered in the distillation of weak nitric acid arise from the presence in the weak acid of small concentrations of nitrous acid. When nitric acid containing nitrous acid is distilled, the nitrous acid decomposes nitric acid to form nitrogen peroxide and water. Substantially 2 mols of fixed nitrogen are evolved and escape with the steam driven out of the weak acid for every 1 mol of nitrous acid present. Corrosion which may occur in the piping and condensing equipment through which the steam is drawn from the distillation apparatus is due to this evolution of nitrogen peroxide. The nitrogen peroxide acts as a non-condensable gas in the steam, thereby decreasing the capacity of a given vacuum distillation apparatus for concentration of the weak acid.

I have further discovered these disadvantages arising from the presence of nitrous acid in the weak nitric acid may be obviated by removing the nitrous acid from the weak nitric acid before distilling it. By removing the nitrous acid from the weak acid evolution of non-condensable, gaseous nitrogen peroxide in the distillation, with a resulting reduction in the vacuum maintained by a given evacuating means, is prevented. I have found that after removal of the nitrous acid, the weak nitric acid may be concentrated under a vacuum employing a barometric liquid jet condenser and such a condenser will efficiently maintain a desired low pressure in the distillation. The liquid jet condenser will function not only to condense the steam but also to remove any residual small amount of non-condensable gas present in the vacuum distillation system. The removal of the nitrous acid prevents loss of nitric acid in the distillation. I have found it particularly advantageous to remove the nitrous acid by aerating the weak nitric acid with air or other oxygen gas at temperatures not substantially above 50° C. Under these conditions, not only is decomposition and loss of nitric acid minimized, but in decomposing the nitrous acid a part of its fixed nitrogen content may be converted into nitric acid. This results from oxidation of the nitric oxide to nitrogen peroxide by the oxygen of the gas and absorption of at least a part of the nitrogen peroxide in the acid and reaction with the water present in the weak acid to form nitric acid. Removal of nitrous acid from the weak nitric acid prevents corrosion by nitrogen peroxide of the vapor lines and condensing equipment used in distilling the acid.

The weak nitric acid may be freed of nitrous acid by aeration at temperatures not substantially above 50° C. in order to prevent substantial reaction of the nitrous acid with the nitric acid and to minimize the amount of nitric acid vaporized by the gas used for aerating the acid. Aeration at temperatures of 30° to 50° C. is preferred. By this aeration of the weak nitric acid, an acid containing nitrous acid may be substantially freed of its nitrous acid content prior to distilling it. The nitrous acid is thus decomposed to form nitric acid and evolve nitric oxide which may, if desired, be recovered from the gases leaving contact with the acid. If an oxygen gas is used, nitric oxide may be oxidized to nitrogen peroxide. It is, of course, obvious that in aerating the acid it should not be treated with a gas which decomposes nitric acid, but that a gas substantially inert towards the nitric acid should be used.

The following example is illustrative of this invention:

By oxidizing ammonia and absorbing the nitrogen oxides thus produced in water, a nitric acid containing 40% $HNO_3$ and about 0.3% $HNO_2$ may be produced. This acid is passed downwardly through a liquid-gas contact tower at a temperature of 30° to 50° C. and air is passed upwardly through the tower in intimate contact with the descending acid until the nitrous acid content of the acid flowing from the bottom of the tower is reduced to 0.02% to 0.03% $HNO_2$.

The aerated acid is distilled in a conventional apparatus involving a boiler for the nitric acid and rectification column for the vapors. The boiler and rectification column are maintained under a reduced pressure substantially below atmospheric, for example a pressure of 200 mm. Hg or lower, by drawing the steam from the top of the rectification column by means of a barometric water jet condenser. In such a condenser the steam is evacuated and condensed by contact with a jet of cold water and any residual small amount of non-condensable gas is removed in a hydrostatic column of water flowing away from the water jet. The weak acid may thus be concentrated to a 60% or stronger acid up to the strength of the constant boiling acid containing 68% $HNO_3$.

It is advantageous to employ the process of this invention for the treatment of weak nitric acid containing 0.1% or more nitrous acid and to remove most of its nitrous acid content before subjecting it to the distillation treatment. It is preferred that the acid distilled contain less than 0.1% nitrous acid.

While I have described above the aeration of the weak nitric acid to remove nitrous acid, my invention is not limited thereto, although it is the preferred method for removing the nitrous acid.

I claim:

1. The process for producing a concentrated nitric acid from a weak nitric acid containing above 0.1% nitrous acid which comprises aerating said weak nitric acid, thereby reducing the nitrous acid content of the weak nitric acid to below 0.1% and thereafter distilling the weak nitric acid under a pressure below atmospheric maintained by means of a barometric water jet condenser.

2. The process for producing a concentrated nitric acid from a weak nitric acid containing above 0.1% nitrous acid which comprises intimately contacting said weak nitric acid at a temperature of 30° to 50° C. with air until the nitrous acid content of said weak nitric acid is reduced to about 0.02–0.03% $HNO_2$, thereafter distilling the thus treated weak nitric acid to produce a concentrated nitric acid under a pressure below atmospheric maintained by means of a barometric water jet condenser.

HERMAN A. BEEKHUIS, Jr.